United States Patent
Walsh

(10) Patent No.: US 10,785,135 B2
(45) Date of Patent: Sep. 22, 2020

(54) TIMELINE ANALYSIS OF NETWORK CONNECTIVITY FOR TRIP PHASES OF MOBILE VEHICLES

(71) Applicant: Viasat, Inc., Carlsbad, CA (US)

(72) Inventor: Richard G. Walsh, Bonsall, CA (US)

(73) Assignee: Viasat, Inc., Carlsbad, CA (US)

( * ) Notice: Subject to any disclaimer, the term of this patent is extended or adjusted under 35 U.S.C. 154(b) by 98 days.

(21) Appl. No.: 16/049,594

(22) Filed: Jul. 30, 2018

(65) Prior Publication Data

US 2020/0036612 A1    Jan. 30, 2020

(51) Int. Cl.
| | |
|---|---|
| H04W 4/40 | (2018.01) |
| H04L 12/26 | (2006.01) |
| H04W 4/029 | (2018.01) |
| G07C 5/00 | (2006.01) |

(52) U.S. Cl.
CPC .......... *H04L 43/0811* (2013.01); *G07C 5/008* (2013.01); *H04W 4/029* (2018.02); *H04W 4/40* (2018.02)

(58) Field of Classification Search
CPC ............................ H04L 43/0811; G07C 5/008
See application file for complete search history.

(56) References Cited

U.S. PATENT DOCUMENTS

| | | | | |
|---|---|---|---|---|
| 2005/0235356 | A1* | 10/2005 | Wang | G06F 16/2477 726/22 |
| 2008/0294484 | A1* | 11/2008 | Furman | G06Q 10/06316 705/7.26 |
| 2015/0163649 | A1* | 6/2015 | Chen | H04W 4/80 455/418 |
| 2015/0350457 | A1* | 12/2015 | Lauer | G06Q 50/30 455/408 |
| 2016/0225171 | A1 | 8/2016 | Lentz et al. | |
| 2018/0054366 | A1 | 2/2018 | Hashmi et al. | |
| 2018/0374009 | A1* | 12/2018 | Hunsaker | G06Q 10/0633 |

FOREIGN PATENT DOCUMENTS

WO    WO 2015184332 A1    12/2015

OTHER PUBLICATIONS

PCT International Search Report and Written Opinion, International Application No. PCT/US2019/038256, dated Sep. 24, 2019, 10 pgs.

* cited by examiner

*Primary Examiner* — Fahmida S Chowdhury
(74) *Attorney, Agent, or Firm* — Holland & Hart LLP

(57) ABSTRACT

Systems and methods for timeline representations of trip phases of a mobile vehicle are described. A method may include receiving operational events associated with a voyage of the mobile vehicle. The operational events may include events such as take-off, landing, door open, door closed, engine started, or other types of operational events. Each operational event may have a corresponding event time at which the event occurred or was detected. The method may include receiving network metric values for network communication metrics associated with a network service on the mobile vehicle. Each network metric value may have a corresponding value time at which the metric was measured or detected. The operational events and network communication metrics may be displayed in a time-aligned manner on a timeline representation over a time range indicated by a user.

25 Claims, 5 Drawing Sheets

TIMELINE ANALYSIS OF NETWORK CONNECTIVITY FOR TRIP PHASES OF MOBILE VEHICLES

BACKGROUND

As evolving satellite technologies have enabled relatively high-speed network communications with mobile vehicles such as airplanes and ships, passenger utilization of these services has increased. The availability of reliable, high-speed Internet and other network communication services has become an important market differentiator for some fleet operators. As a result, monitoring network communication usage and diagnosing the causes of coverage lapses has become increasingly critical. Fleet operators may need to understand how and when their customers use on-board network services, for example, while network communication providers (e.g., satellite operators, etc.) may want to understand the circumstances under which network service may be degraded.

Monitoring and debugging network communications for a mobile vehicle may be challenging, however. Some mobile vehicles traverse routes that cover long distances across relatively remote locations and may experience environmental or other operating conditions that are specific to the mode of transportation, making it difficult to identify the timing and causes of lapses in coverage. Further, passenger demand for network communication services may vary at different times of the day or for different portions of a trip. These changing vehicle and passenger conditions may affect the quality or utilization of network communications. As a result, improved systems and methods for monitoring network communication service on a mobile vehicle may be useful.

SUMMARY

In view of the foregoing, aspects for providing a timeline analysis of network connectivity for trip phases of mobile vehicles are described below.

A method of providing a timeline analysis of network connectivity for trip phases of mobile vehicles for a mobile vehicle is described. The method may include receiving, from the mobile vehicle, a set of operational events associated with the mobile vehicle, where each of the operational events is associated with an event time. The method may include receiving a set of network metric values for each of one or more network communication metrics associated with a network access service provided by a communication system to a set of devices on the mobile vehicle via a network access terminal of the mobile vehicle, where each of the network metric values is associated with a value time. The method may include receiving, via an input device, an indication of a time range, and in response to receiving the indication, displaying, on an electronic display, a timeline representation that includes a first visual indication of one or more of the set of operational events that are associated with respective event times within the time range displayed on the timeline according to the respective event times, and a second visual indication of one or more of the set of network metric values that are associated with respective value times within the time range displayed on the timeline according to the respective value times.

An apparatus for providing a timeline analysis of network connectivity for trip phases of mobile vehicles for a mobile vehicle is described. The apparatus may include a processor, memory in electronic communication with the processor, and instructions stored in the memory. The instructions may be executable by the processor to cause the apparatus to receive, from the mobile vehicle, a set of operational events associated with the mobile vehicle, where each of the operational events is associated with an event time. The instructions may be executable to receive a set of network metric values for each of one or more network communication metrics associated with a network access service provided by a communication system to a set of devices on the mobile vehicle via a network access terminal of the mobile vehicle, where each of the network metric values is associated with a value time. The instructions may be executable to receive, via an input device, an indication of a time range, and in response to receiving the indication, display, on an electronic display, a timeline representation that includes a first visual indication of one or more of the set of operational events that are associated with respective event times within the time range displayed on the timeline representation according to the respective event times and a second visual indication of one or more of the set of network metric values that are associated with respective value times within the time range displayed on the timeline representation according to the respective value times.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

A communications satellite may be configured to provide network communications to target devices (e.g., terminals) which may be mobile (e.g., installed or operated on a mobile vehicle such as an aircraft, motor vehicle, boat, train, etc.). Mobile vehicles may be part of a fleet, such as a fleet of aircraft, for example. Passengers on a mobile vehicle may use such devices during a trip for accessing the Internet or for other network services, for example. Network service providers may monitor and collect network communication service metrics associated with the network communication services during a trip to identify periods of degraded service or lapses in service.

Mobile vehicles may include systems and sensors that collect information about various operating events associated with the mobile vehicle, such as when a door is opened or closed, when a flight takes off or lands, when a train leaves or arrives at a station, etc. In addition, a mobile vehicle may monitor and collect positioning information, such as altitude, elapsed distance, latitude, longitude, etc. In some cases, a trip phase of the mobile vehicle may be defined in terms of one or more operating events. For example, a trip phase that is a flight of an aircraft may be defined as the time period that occurs between a take-off event and a landing event. Fleet operators may use information about operating events and trip phases to analyze various fleet-related metrics, such as a percentage of flights that are on time for a particular route or tail number, etc.

Historically, network communication metrics and mobile vehicle operational events have been analyzed independently, for different purposes. However, various aspects of the instant application provide methods and tools for correlating network communication metrics with mobile vehicle operational events or other vehicle-related data for multi-dimensional network connectivity analysis.

Figure 1:
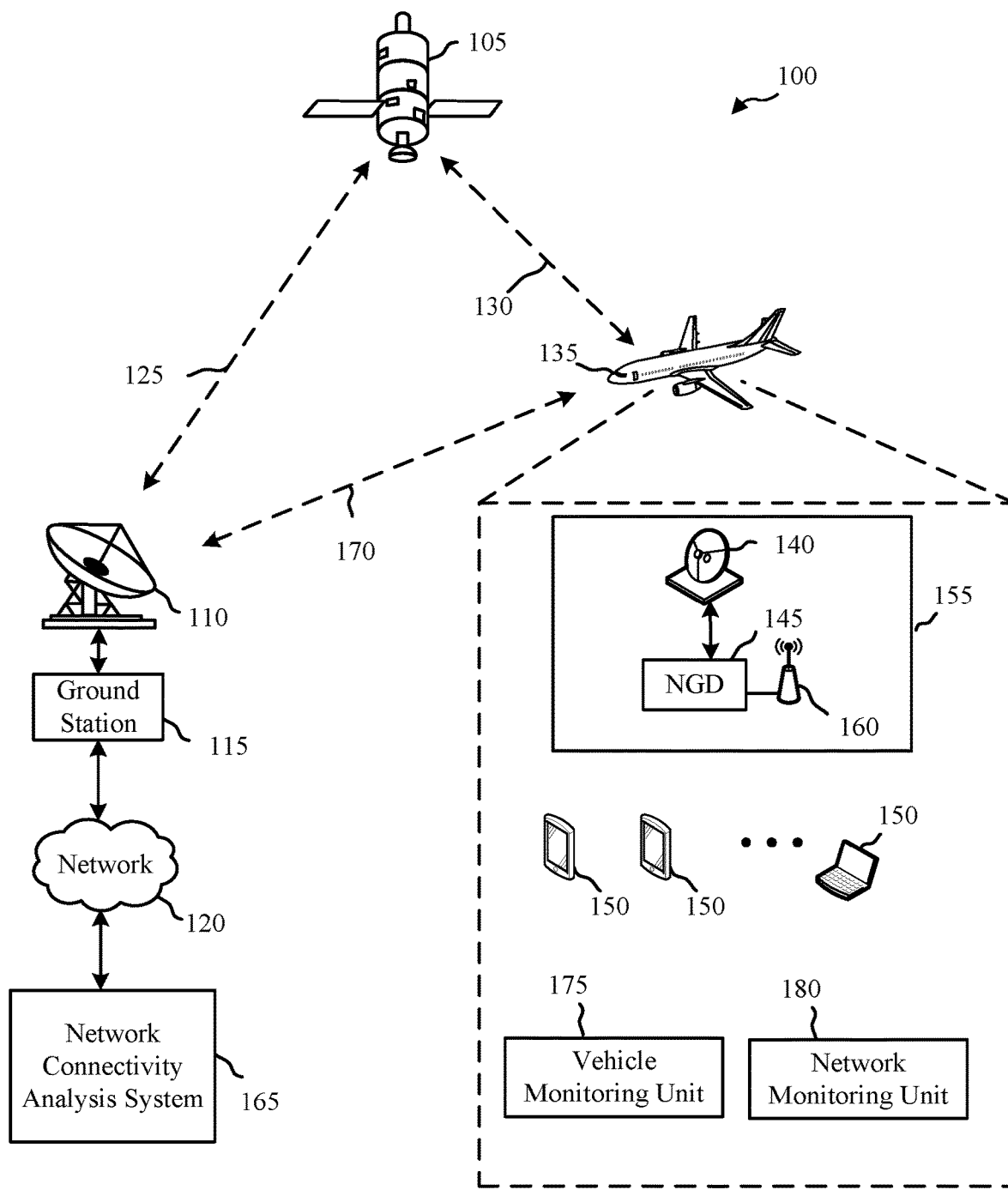
FIG. 1 shows a diagram of a communication system that supports timeline analysis of network connectivity for trip phases of mobile vehicles, in accordance with aspects of the present disclosure.

FIG. 1 shows a simplified diagram of an example communications system 100 which may support timeline analysis of network connectivity for trip phases of mobile vehicles in accordance with various aspects of the disclosure. The communication system 100 includes a satellite 105 (or multiple satellites 105), a ground station 115, a ground station antenna system 110, and a network access terminal 155. In operation, the communication system 100 provides network access service via the network access terminal 155 to multiple communication devices 150 on mobile vehicle 135, which may be an aircraft (depicted), train, boat, etc. For example, the communication system 100 may provide for two-way communications between the network access terminal and a network 120 via the satellite 105 and the ground station 115. For example, the communication system 100 may provide for two-way communications between the network access terminal and a network 120 or ground station 115 via an air-to-ground connection 170 (e.g., for airborne mobile vehicles).

More generally, although FIG. 1 depicts a mobile vehicle 135 that is an aircraft, similar or analogous systems may be used for terrestrial mobile vehicles, such as trains, buses, automobiles, etc. For example, a communications system 100 may provide for two-way communications between the network access terminal 155 on the vehicle 135 and a network 120 or ground station 115 via a ground-to-ground connection (e.g., for terrestrial mobile vehicles), without the use of a satellite 105.

The network access terminal 155 may include a network gateway device 145, an antenna 140, and one or more access points 160 (e.g., wired access points, wireless access points (WAPs), etc.). The communication devices 150 may be connected to the network access terminal 155 via the one or more access points 160. The network gateway device 145 may perform the functions of a modem such as modulation and demodulation of signals, packet queuing, packet acceleration/de-acceleration, and other signal processing functions. The network gateway device 145 may also perform gateway functions such as network address translation, a firewall, and the like.

The satellite or satellites 105 may include any suitable type of communication satellite. In some examples, some or all of the satellites may be in geostationary orbits. In other examples, any appropriate orbit (e.g., medium earth orbit (MEO), low earth orbit (LEO), etc.) for satellite 105 may be used.

The ground station 115 sends and receives signals to and from the satellite 105 via communication link 125 using the ground station antenna system 110. The ground station antenna system 110 may be two-way capable and designed with adequate transmit power and receive sensitivity to communicate reliably with the satellite 105.

The antenna 140 may communicate signals with the satellite 105 via the communication link 130. The antenna 140 may be mounted to an elevation and azimuth gimbal which points the antenna 140 (e.g., actively tracking) at satellite 105. The communication system 100 may operate in the International Telecommunications Union (ITU) Ku, K, or Ka-bands, for example from 17.7 to 21.2 Giga-Hertz (GHz). Alternatively, communication system 100 may operate in other frequency bands such as C-band, X-band, S-band, L-band, and the like.

In some cases, mobile vehicle 135 may include a vehicle monitoring unit 175 that includes on-board electronics for monitoring and transmitting data associated with various operational events associated with the mobile vehicle 135. Vehicle monitoring unit 175 may include sensors, processors, servers, transceivers, or other relevant electronics to enable vehicle monitoring unit 175 to detect and/or monitor operational events associated with mobile vehicle 135, and transmit data associated with the operational events.

Such operational events may depend on the type of mobile vehicle. Such operational events may include a departure or arrival event, such as a take-off or landing event, a "weight on wheels" or "weight off wheels" event, a docking or undocking event, etc. Such operational events may include an embarkation event, such as a "door opened" or "door closed" event or a "gangway lowered" or "gangway raised" event. Such operational events may include an actual departure time or an actual arrival time. Such operational events may include a vehicle status event, such as current orientation (e.g., pitch, yaw, roll), current airspeed, elapsed trip duration, vehicle status change (e.g., in service, out of service, in-flight, engine running, etc.).

In some cases, vehicle monitoring unit 175 of mobile vehicle 135 may store a log of such operational events in an on-board server (which may be part of vehicle monitoring unit 175 or may be separate from vehicle monitoring unit 175) or may transmit such operational events for terrestrial storage; e.g., via communications satellite 105. In some cases, mobile vehicle 135 may include vehicle-specific communication buses or protocols, such as an ARINC (Aeronautical Radio, Inc.) avionics protocol, that may be used to monitor or record various operational events associated with mobile vehicle 135.

In some cases, vehicle monitoring unit 175 of mobile vehicle 135 may include sensors that enable vehicle monitoring unit 175 to monitor position values of mobile vehicle 135, such as altitude, longitude, latitude, elapsed distance from an origination terminal, etc. In some cases, each position value may be associated with a corresponding value time, which may be the time at which the mobile vehicle was at the position value or the time at which the position value was recorded.

In some cases, mobile vehicle 135 may be associated with or identified by various identifiers, such as a vehicle identifier (e.g., tail number or vessel ID), trip number (e.g., flight number), travel segment number (e.g., route number), crew identifiers (e.g., crew numbers specifying specific crew members), equipment identifiers (e.g., serial numbers for antennas or network devices) origination terminal identifier, destination terminal identifier, scheduled departure time, and/or scheduled arrival time, for example.

In some cases, various network communications data or metrics may be collected or transmitted by a network monitoring unit 180 of mobile vehicle 135 or by separate network monitoring systems; e.g., systems used by network service providers, for example. Network monitoring unit 180 may include sensors, processors, servers, transceivers, or other relevant electronics to enable network monitoring unit 180 to determine, collect, store, and/or transmit network communications data and determine, collect, store, and/or transmit network communications metrics.

Such network communication data may include a number of devices (e.g., devices that may be connected with the network), a quality of service for the devices (e.g., in terms of bandwidth, network connectivity status, error rate, or other metric), a type of the devices (e.g., laptop, cell phone, etc.), a data rate (e.g., a data transmission rate, such as in Mbits per second), a data volume (e.g., an amount of data transferred, such as in MBytes), a modulation and coding scheme for communications via the network access terminal 155, bandwidth information associated with the communications via the network access terminal 155 (e.g., an available amount of bandwidth for the network), an error rate for the communications via the network access terminal 155, a latency for the communications via the network access terminal 155 (e.g., a latency between the network and a ground-based terminal or satellite), traffic type information for traffic associated with the devices, user subscription information associated with the devices (e.g., how many devices are subscribed to the network using a default subscription or a premium subscription), a status of the network gateway device 145 (e.g., whether it is online or offline, which satellite beam it is connected to, etc.), or a status of auxiliary equipment (e.g., such as temperature or pointing direction of an antenna) to the network access terminal 155.

In some cases, some network communication metrics may be measured or collected (e.g., by a network monitoring unit 180) using test protocols. For example, error rates, data rates, and latencies may be determined by having a device connected to the network transmit one or more test packets via the network, receive a response, and measure or determine the associated error rate, data rate, and/or latency associated with the transmission and response.

As previously discussed, network communication metrics may typically be collected and analyzed by network service providers, while operational events associated with a mobile vehicle may typically be collected and analyzed by fleet operators. Each of these types of analyses may typically be accomplished using separate tools and methods.

However, an important insight with respect to network communication services provided on a mobile vehicle is that, unlike network communication services provided at a stationary location, the network performance or usage may be correlated with or affected by certain operational events, positioning, or trip phases of the mobile vehicle. Therefore, methods and tools that may be used to help identify such correlations may be extremely useful in the context of analyzing network communication metrics on a mobile vehicle. For example, such tools may enable a user to determine that every time a particular aircraft (or type of aircraft) begins its descent for landing, network connectivity is lost. Or perhaps that network connectivity is often degraded during a five-minute period after the doors are closed for departure. Such correlations may provide important clues regarding the context in which the network performance is lost. Traditional tools and methods may not support such analysis; accordingly, new tools and methods, such as a timeline analysis of network connectivity for trip phases of mobile vehicles, are needed. In some cases, a network connectivity analysis system 165 (described in more detail with reference to FIG. 4) may support such analysis.

Figure 2:
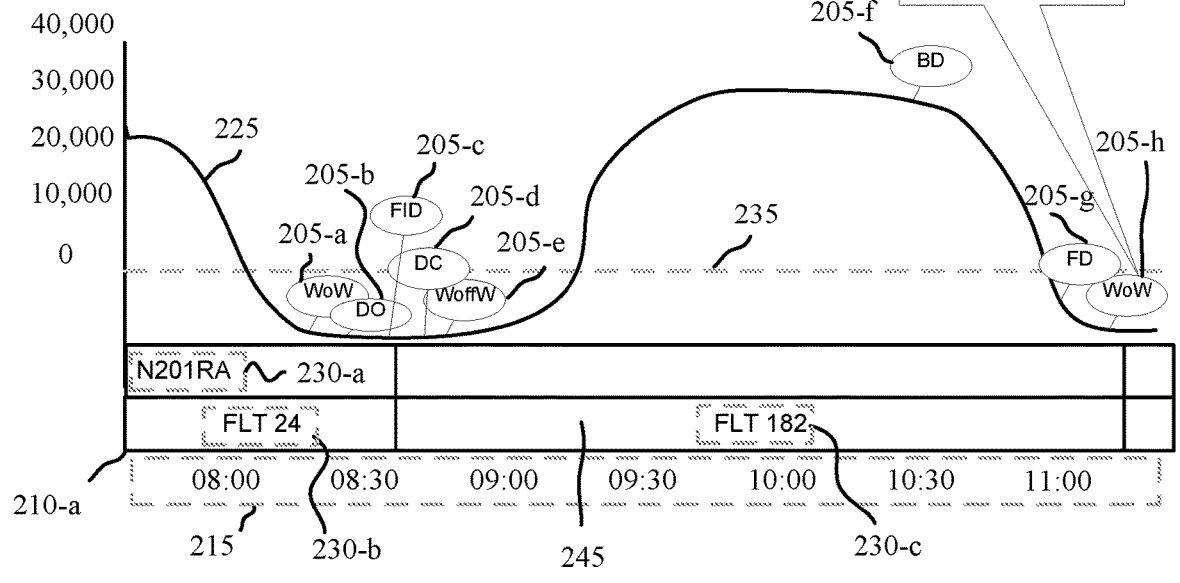
FIG. 2 illustrates a timeline analysis of network connectivity for trip phases of mobile vehicles, in accordance with aspects of the present disclosure.
Figure 2:
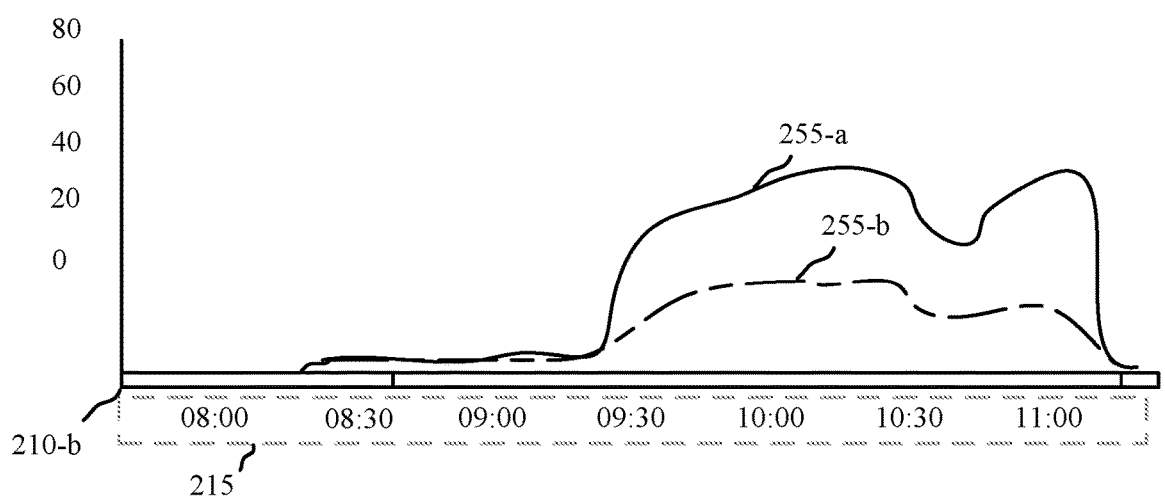

FIG. 2 depicts an example timeline representation 200 of trip phases, in accordance with various embodiments of the disclosure. In this example, the trip is a flight(s) of an aircraft 250, which may be an example of mobile vehicle 135.

Timeline representation 200 includes two timelines 210-a, 210-b that are vertically time-aligned by times of day 215. Timelines 210-a, 210-b depict visual indications of vehicle operational events 205 and visual indications of network communications metric values 255 over the same time range 220. In some cases, time range 220 may be specified or indicated by a user via an input device such as a keyboard or microphone, for example. In some cases, time range 220 may include a calendar date and time.

Timeline 210-a includes visual indications of aircraft operational events 205 that are associated with event times falling within time range 220. In this example, the visual indications of operational events 205-a, 205-b, 205-c, 205-d, 205-e, 205-f, 205-g, 205-h are graphical elements that include a text abbreviation of the corresponding operational event displayed within a callout symbol, although other graphical elements may be used.

For an aircraft, operational events may include, among others:

| Abbreviation | Meaning |
|---|---|
| BD | Begin descent (e.g., for landing) |
| DC | Door closed (e.g., in preparation for departure) |
| DO | Door open (e.g., for passenger embarkation, disembarkation) |
| FD | Flaps down |
| FID | Origin/destination entered |
| FN | Flight number entered |
| WoffW | Weight Off Wheels (e.g., at takeoff) |
| WOW | Weight on Wheels (e.g., at touchdown) |

Each visual indication of an operational event 205 may be displayed at a location on timeline 210-a based on an event time associated with the operational event 205. The event time may be the time (or date and time) at which the event occurred or was detected. For example, the first weight-on-wheels (WoW) operational event 205-a depicted in timeline 210-*a* may be associated with an event time of 8:15, and the weight-off-wheels (WoffW) operational event 205-*d* may be associated with an event time of approximately 8:40. Thus, timeline 210-*a* may depict operational events associated with an aircraft that lands at 8:15 and takes off again at 8:40.

Timeline 210-*a* includes several vehicle identifiers 230 that may be associated with mobile vehicle 135. These include tail number 230-*a* and flight numbers 230-*b*, 230-*c*. Such vehicle identifiers may be useful, for example, for correlating operational events 205 and network communication metrics 255 with specific vehicles, routes, etc. Timeline 210-*a* may depict the ending of a first flight (FLT 24) and the entirety of a second flight of aircraft 250 (FLT 182).

Timeline 210-*a* includes a graph of position values 225 associated with the location of aircraft 250 during time range 220. The graph of position values 225 may indicate position values based on position times corresponding to the position values. A position time may be the time (or date and time) at which the mobile vehicle was at the position value.

In this example, the position values are altitude values, and the graph of position values 225 indicates that aircraft 250 was at an altitude of approximately 32,000 feet at the beginning of time range 220, descended and landed at approximately 8:15, remained on the ground at an altitude of 0 feet until approximately 8:40, and ascended to an altitude of approximately 40,000 feet by approximately 9:45. Aircraft 250 then descended again and landed at approximately 11:15.

Timeline 210-*a* includes a visual indication of a position threshold 235. In this example, the position threshold is an altitude threshold of 10,000 feet, which may be an altitude at which passengers aboard aircraft 250 may be able to begin using devices 150 and establish network communications; e.g., via network terminal 185. In this example, the visual indication of the position threshold 235 is a dashed line; other visual indications are possible.

In some embodiments, a timeline 210 may include an indication of a trip phase associated with mobile vehicle 135. Timeline 210-*a*, for example, includes an indication of a trip phase 245, which may be a flight of aircraft 250. The indication of the trip phase 245 includes an indication of a start time and an end time associated with the trip phase; in this case, the trip phase 245 (e.g., FLT 182) starts at approximately 8:40 and ends at approximately 11:15, as indicated by a horizontal bar that starts and ends at these times. In some cases, a trip phase may be determined based on the event time(s) associated with one or more operational events. In the example depicted in FIG. 2, the trip phase 245 may be based on the event time associated with the "FID" (origin/destination entered) operational event 205-*c* and the event time associated with the "WoW" (weight on wheels) operational event 205-*h*.

In some embodiments, if multiple operational events 205 occur near the same time such that their corresponding visual indications are overlapped, the visual indication of the most recent operational event 205 may be displayed overlaid on the visual indication(s) of earlier operational events.

In some embodiments, if a user selects an operational event 205 (e.g., by clicking on the visual indication of the operational event or hovering a cursor over it, etc.), such as operational event 205-*h*, additional details 240 about the operational event 205-*h* may be displayed, such as a specific event date and time associated with the operational event, and/or a more detailed description of the operational event, etc.

In some embodiments, while timeline representation 200 is displayed, a user may indicate a second time range for timeline representation 200; e.g., a time range that is different from the time range initially indicated by the user. In response to receiving the indication of the second time range, the display of timeline representation 200 may be updated based on the second time range such that time range 220 is set to the second time range.

In some embodiments, a user may indicate a second time range by selecting a flight number 230 (e.g., by clicking or hovering over flight number 230-*b* or 230-*c*). In this case, timeline representation 200 may be updated to change time range 220 such that it begins and ends at the times when the selected flight number 230-*b*, 230-*c* begins and ends. For example, if a user selects flight number 230-*c* ("FLT 182"), the display of timeline representation 200 may be updated based on the second time range such that time range 220 begins at 08:40 and ends at 11:10, corresponding to event times associated with operational event 205-*c* ("FID," destination/origin entered) and operational event 205-*h* ("WoW," weight on wheels) that define a flight 230-*c*.

In some embodiments, a user may indicate a second time range by panning or zooming the display of timeline representation 200. In response to receiving an indication of a pan or zoom operation, the display of timeline representation 200 may be updated such that time range 220 is based on a second time range that is based on the pan or zoom operation.

In some embodiments, visual indications of operational events 205 may be displayed overlaid with the graph of position values 225, which may enable a user to easily identify the altitude or location of the aircraft at the time when the operational event 205 occurred.

Timeline representation 200 further includes timeline 210-*b*. Each time of timeline 210-*b* is vertically aligned with the same time of timeline 210-*a*. Timeline 210-*b* includes graphs of network communication metric values 255-*a*, 255-*b* that are displayed on timeline 210-*b* according to value times associated with the network communication metric values. A value time may be a time (or date and time) at which the network communication metric value occurred or was determined.

In this example, the graphs of network communication network values 255 depict the number of devices that are currently active; e.g., a number of devices that have subscribed to a network communication service, such as Internet access. Graph 255-*a* indicates the number of devices that have subscribed to a default network communication service, and graph 255-*b* indicates the number of devices that have subscribed to a premium network communication service, which may provide a greater bandwidth than the default network communication service.

By displaying timeline 210-*b* time-aligned with timeline 210-*a*, a user may be able to correlate various network communications metric values with various aircraft operational events, thereby enabling the user to analyze network service usage and quality in the context of specific events on a flight and/or positions of the flight.

For example, based on the timeline representation 200 of FIG. 2, a user may be able to determine that there is a small, non-zero demand for network services when a flight is on the ground (e.g., between approximately 8:15 and 8:45), and the demand for network services rises significantly when the flight reaches the threshold altitude of 10,000 feet. Further, a user may be able to readily determine that there is a dip in demand when the aircraft begins its descent (as indicated by a "BD" operational event 205-*f*).

Timeline representation 200 may also be used to help determine the cause of a network connectivity problem. For example, timeline 210-*b* indicates that there are no devices connected during the descent of flight 24 (e.g., between approximately 7:45 and 8:15). In some cases, this may be because all of the users have turned off their devices in preparation for landing. In other cases, it may indicate a lapse in network connectivity that may be correlated, using timeline representation 200, with the descent and landing of the aircraft.

In some cases, by analyzing multiple such timeline representations 200 across a fleet of aircraft and/or routes, for example, it may be possible to pinpoint a particular trip phase (e.g., a descent), and/or a particular aircraft (e.g., N201RA), and/or a particular flight (e.g., FLT 24), or even a particular cabin crew that is correlated with particular network service behavior (e.g., a loss of connectivity, increased demand, etc.).

By viewing such timeline representations 200 for multiple flights, multiple routes, etc. a user may be able to predict demand for network services, for example, or identify vehicle-related circumstances under which network services may exhibit communication degradation or failures.

Figure 3:
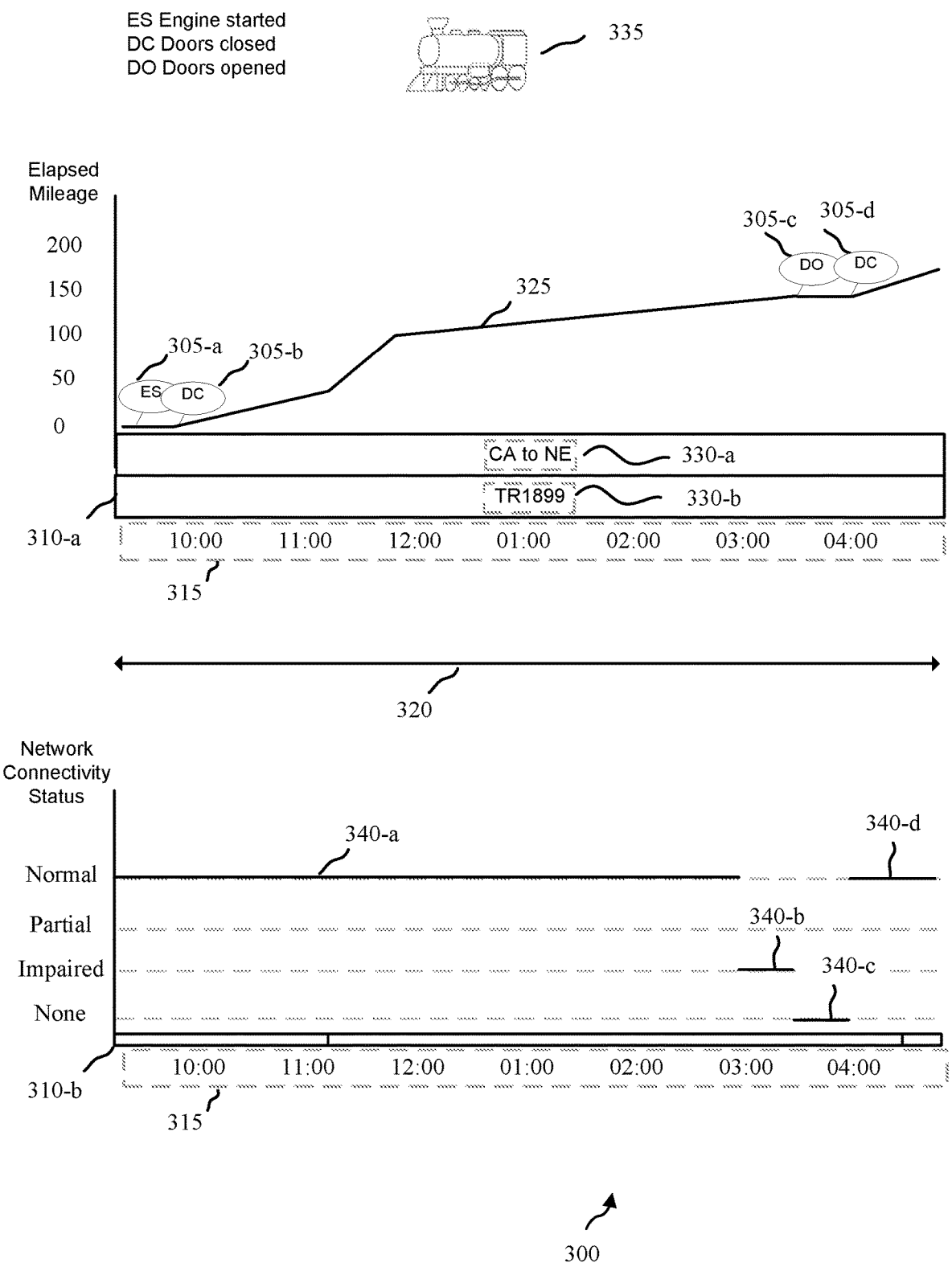
FIG. 3 illustrates a timeline analysis of network connectivity for trip phases of mobile vehicles, in accordance with aspects of the present disclosure.

FIG. 3 depicts an example of a timeline representation 300 of trip phases, in accordance with various embodiments of the disclosure. In this example, the voyage may be trip taken by a passenger train 335.

Timeline representation 300 includes two timelines 310-*a*, 310-*b* that are vertically time-aligned by times of day 315. Timelines 310-*a*, 310-*b* depict various vehicle operational events 305 and network communications metric values 340-*a*, 340-*b*, 340-*c*, 340-*d* over the same time range 320. In this case, the operational events may be events associated with a train 335.

Timeline 310-*a* includes visual indications of operational events 305 that are associated with event times falling within time range 320.

Timeline 310-*a* includes a graph of position values 325 associated with the location of train 335 during time range 320. In this example, the position values are elapsed distance values, and the graph of position values 325 indicates that train 335 traveled slightly over 1000 miles from its departure terminal during time range 320. The position values are displayed on timeline 310-*a* based on their corresponding position times.

As described previously with respect to FIG. 2, each visual indication of an operational event 305 may be displayed at a location on timeline 310-*a* based on an event time associated with the operational event 305. Timeline 210-*a* includes several vehicle identifiers 330 that may be associated with train 335. These include route 330-*a* and train number 330-*b*.

Timeline representation 300 includes timeline 310-*b*. Each time of timeline 310-*b* is vertically aligned with the same time of timeline 310-*a*. Timeline 310-*b* includes visual indications of network communication metric values 340-*a*, 340-*b*, 340-*c*, 340-*d* that are displayed on timeline 310-*b* according to value times associated with the network communication metric values.

In this example, the network communication metric values may be connectivity status values, and may indicate whether the network connectivity is normal, partial, impaired, or none (i.e., no connectivity) at various times 315 during time range 320.

By displaying timeline 310-*b* time-aligned with timeline 310-*a*, a user may be able to correlate network connectivity status (or other network connection metrics) with various train operational events, thereby enabling the user to analyze network service usage and quality in the context of specific events on a train trip. For example, based on the timeline representation 300 of FIG. 3, a user may be able to determine that network connectivity status was normal until train 335 approached and then arrived at a train station, as indicated by operational event 305-*c* ("Doors opened"). Shortly before arrival, at approximately 10:30, network connectivity status dropped to impaired, and between the event times associated with operational events 305-*c* and 305-*d* (e.g., between "doors opened" and "doors closed") there was no network connectivity. During this period, the elapsed mileage did not increase, indicating that the train was stopped. Based on the graph of elapsed mileage and operational events 305-*c* and 305-*d*, it can be inferred that train 335 was at the train station between approximately 10:45-11:00, and during this time period, network connectivity was lost (i.e., indicated as "none" on timeline 310-*b*). Network connectivity status went back to "normal" status after the event time associated with operational event 305-*d* (approximately 11:00), when the train 335 departed the station and the elapsed mileage resumed its increase. Such information may be quite useful to train operators and network service providers, for example.

While FIGS. 2-3 depict timeline representations 200, 300 that each include two timelines 210, 310, other timeline representations may include a single timeline depicting operational events, position values, and one or more network communication metrics on the same timeline. For example, visual indications of operational events or position values may be overlaid on or by visual indications of network communication metrics. Alternatively, a timeline representation may include more than two timelines. For example, a single timeline representation may include timelines similar to 210-*a*, 210-*b*, and 310-*b*, and/or additional timelines depicting additional network communication metric values that are displayed in a time-aligned manner.

Figure 4:
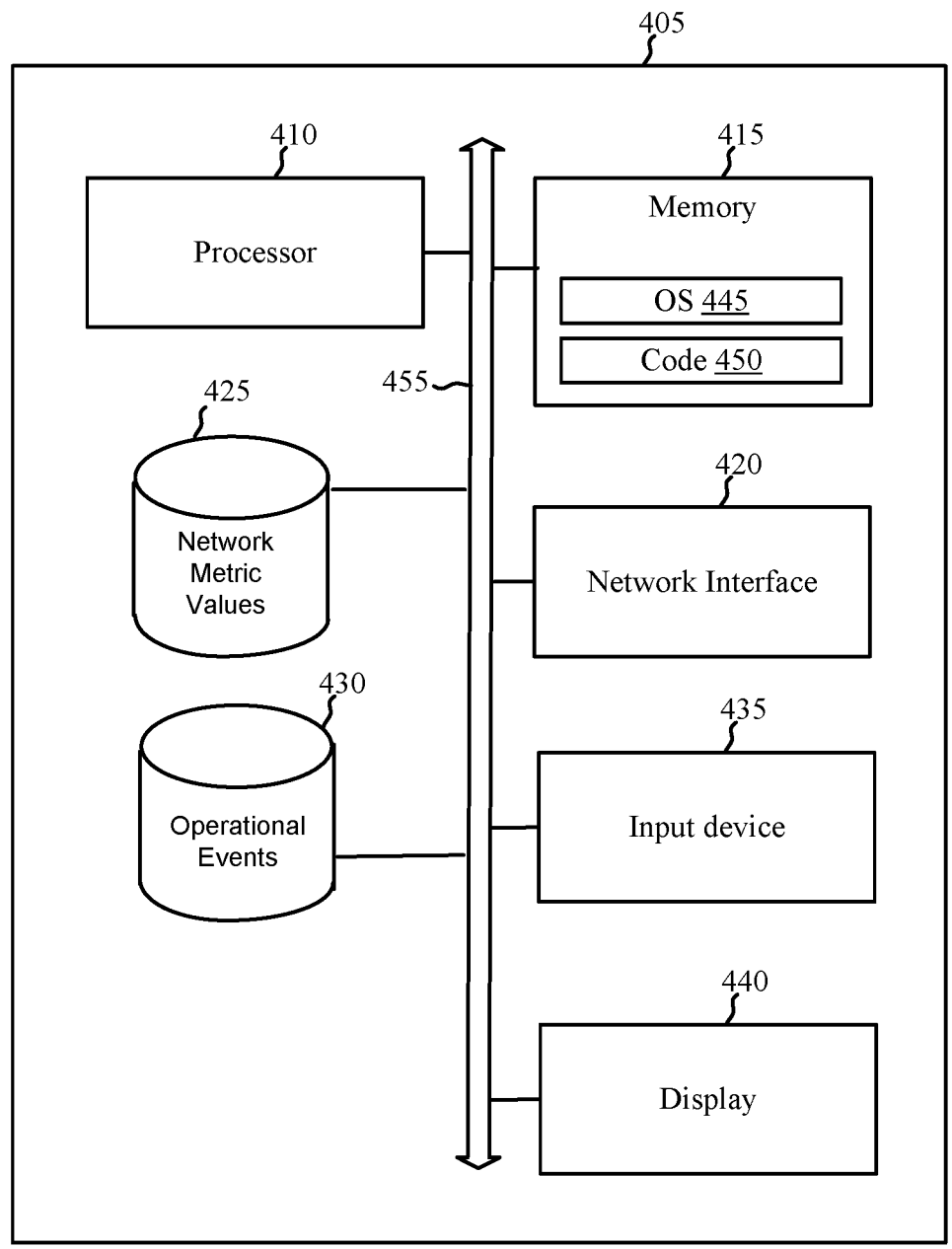
FIG. 4 shows a diagram of a computing system that supports timeline analysis of network connectivity for trip phases of mobile vehicles, in accordance with aspects of the present disclosure.

FIG. 4 shows a block diagram 400 of a network connectivity analysis system 405 that may support generation and display of a timeline analysis of network connectivity for trip phases of mobile vehicles in accordance with aspects of the present disclosure. The network connectivity analysis system 405 may be an example of network connectivity analysis system 165 described with reference to FIG. 1. Network connectivity analysis system 405 may include a processor 410, memory 415, network interface 420, network metric values database 425, operational events database 430, input device 435, and display 440. Each of these components may be in communication with each other, directly or indirectly, over one or more buses 455.

The memory 415 may include random access memory (RAM) and/or read-only memory (ROM). The memory 415 may store an operating system (OS) 445 (e.g., built on a Linux or Windows kernel). The memory 415 may also store computer-readable, computer-executable code 450 including instructions that are configured to, when executed, cause the processor 410 to perform various functions described herein related to generating and displaying timeline representations of trip phases. Alternatively, the code 450 may not be directly executable by the processor 410 but be configured to cause the network connectivity analysis system 405 (e.g., when compiled and executed) to perform one or more of the functions described herein.

The network metric values database 425 may store network metric values and associated value times for various network communication metrics associated with a network access service, such as the network communication metrics described with respect to FIGS. 2-3. The network metric values database 425 may store network metric values received from a network access terminal, such as network access terminal 155.

The operational events database 430 may store operational events and associated event times, such as the operational events described with respect to FIGS. 2-3. The operational events database 430 may store operational events received from a mobile vehicle, such as mobile vehicle 135.

Input device 435 may be used, by a user, to provide an indication of a time range. Input device 435 may be a keyboard, for example, or a microphone, a touchscreen, or any other appropriate input hardware.

Display 440 may be used to display a timeline analysis of network connectivity for trip phases of mobile vehicles, such as timeline representations 200, 300 described with respect to FIGS. 2-3. Display 440 may be an electronic display, such as a CRT display, LCD display, touchscreen, mobile device screen, etc.

In some cases, the components of network connectivity analysis system 405 may be located within a single location or enclosure. In some cases, the components of network connectivity analysis system 405 may be distributed across multiple locations or enclosures. For example, network metric values database 425 and/or operational events database 430 may reside at a different location than display 440 or than other components of network connectivity analysis system 405, and may be accessed remotely (e.g., via a network).

Figure 5:
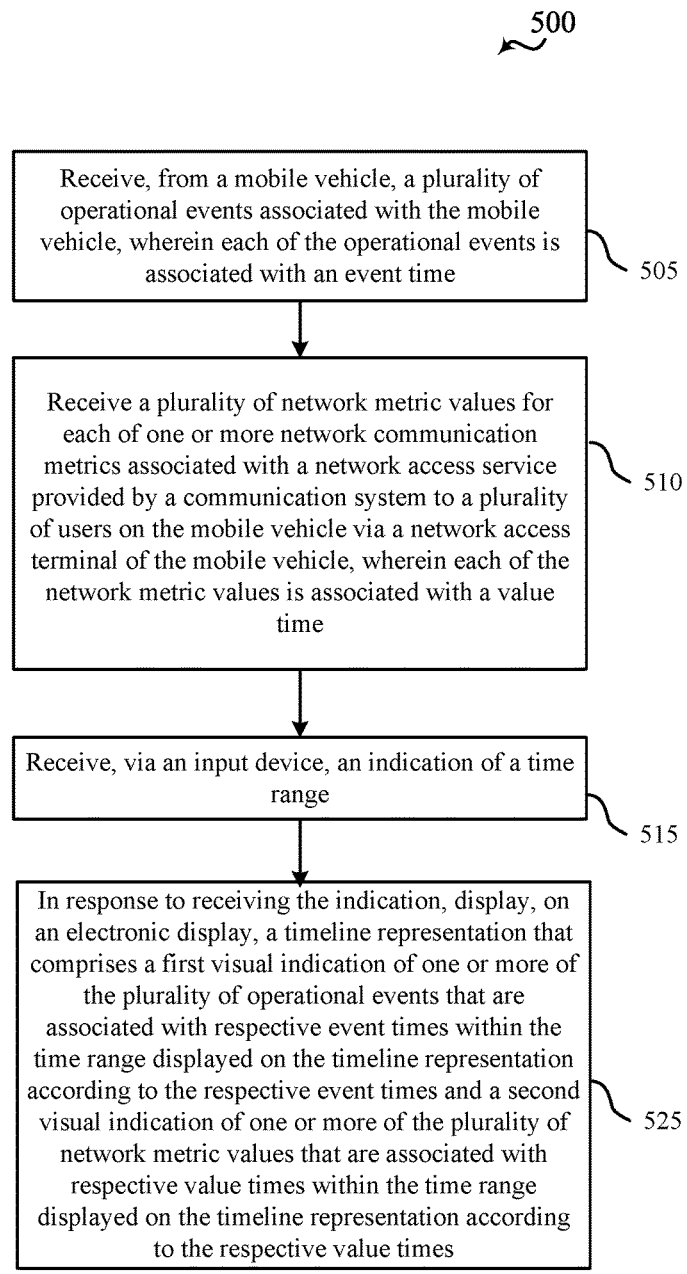
FIG. 5 illustrates a flow chart of an example method that supports timeline analysis of network connectivity for trip phases of mobile vehicles, in accordance with aspects of the present disclosure.

FIG. 5 depicts a method of generating a timeline analysis of network connectivity for trip phases of mobile vehicles, in accordance with various embodiments of the disclosure.

Block 505 may include receiving, from a mobile vehicle, a plurality of operational events associated with the mobile vehicle, wherein each of the operational events is associated with an event time. In some embodiments, the mobile vehicle may be an aircraft, such as aircraft 250, or a train, bus, ship, helicopter, or other type of mobile vehicle. In some embodiments, the operational events may include operational events 205, 305 described with respect to FIGS. 2-3, for example. In some embodiments, the event times may be a time of day or date and time of day at which the operational event occurred or was detected, for example. In some embodiments, the operational events may be received via a network interface, such as network interface 420, and stored in a database, such as operational events database 430.

Block 510 may include receiving a plurality of network metric values for each of one or more network communication metrics associated with a network access service provided by a communication system to a plurality of users on the mobile vehicle via a network access terminal of the mobile vehicle, wherein each of the network metric values is associated with a value time. In some embodiments, the network access service may be a bidirectional network service that enables user devices to receive and transmit data to a network, such as an Internet service. In some embodiments, the network access terminal may include a modem, single access point, or other type of communication link.

In some embodiments, the network metric values may be received from a network entity of the communication system, such as network access terminal 155 described with respect to FIG. 1. In some embodiments, the network metric values may be received via a network interface, such as network interface 420, and stored in a database, such as network metric values database 425.

In some embodiments, the network communication metrics may include a number of the plurality of devices, a quality of service for the plurality of devices, a type of the plurality of devices, a data rate, a data volume, a modulation and coding scheme for communications via the network access terminal, bandwidth information associated with the communications via the network access terminal, an error rate for the communications via the network access terminal, a latency for the communications via the network access terminal, traffic type information for traffic associated with the plurality of devices, user subscription information associated with the plurality of devices, a status of the network access terminal, or a status of an auxiliary equipment to the network access terminal.

In some embodiments, the value time may be the time of day or the date and time of day at which the value is measured or determined.

Block 515 may include receiving, via an input device (e.g., input device 435), an indication of a time range. In some embodiments, the indication of the time range may be a time range received from a user via an input device such as a keyboard or microphone, for example. In some embodiments, the time range may include a starting time of day, an ending time of day, a starting date, an ending date, or any combination, for example. In some embodiments, the time range may include a month, a year, a season, a calendar quarter, or any other type of time range, or any combination.

Block 520 may include, in response to receiving the indication, displaying, on an electronic display (e.g., display 440), a timeline representation (e.g., timeline representation 200, 300) that comprises a first visual indication of one or more of the plurality of operational events that are associated with respective event times within the time range displayed on the timeline according to the respective event times and a second visual indication of one or more of the plurality of network metric values that are associated with respective value times within the time range displayed on the timeline according to the respective value times. In some embodiments, the timeline representation may include one or more timelines such as timelines 210-*a*, 210-*b*, 210-*c*, 210-*d* described with respect to FIGS. 2-3. In some embodiments, the visual indication of the operational events may include a graphical element, such as the call-out symbols representing operation events 205 described with respect to FIG. 2. In some embodiments, the visual indication of the network metric values may include a graphical element, such as graphs of the number of devices that have subscribed to the network 255-*a*, 255-*b* as described with respect to FIG. 2 or graphs of network connectivity status 340-*a*, 340-*b*, 340-*c*, 340-*d* as described with respect to FIG. 3. A person of skill in the art will appreciate that many other types of graphical elements for representing operational events and/or network communication metric values may be appropriate, without departing from the scope of this disclosure.

The detailed description set forth above in connection with the appended drawings describes examples and does not represent the only examples that may be implemented or that are within the scope of the claims. The term "example," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical positions. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, flash memory, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

What is claimed is:

1. A method of monitoring network communication for a mobile vehicle, the method comprising:

receiving, from the mobile vehicle, a plurality of operational events associated with at least a first trip and a second trip of the mobile vehicle, wherein each of the operational events is associated with an event time;

receiving a plurality of network metric values for each of one or more network communication metrics associated with a network access service provided by a communication system to a plurality of devices on the mobile vehicle via a network access terminal of the mobile vehicle, wherein each of the network metric values is associated with a value time;

receiving, via an input device, an indication of a time range associated with the first trip of the mobile vehicle;

in response to receiving the indication, displaying, on an electronic display, a timeline representation that comprises:

a first visual indication of one or more of the plurality of operational events that are associated with respective event times within the time range displayed on the timeline representation according to the respective event times; and a second visual indication of one or more of the plurality of network metric values that are associated with respective value times within the time range displayed on the timeline representation according to the respective value times;

while displaying the timeline representation, receiving an indication of a second time range via a panning or zooming input, wherein the second time range is associated with a portion of the first trip and a portion of the second trip; and in response to receiving the indication of the second time range, updating the display of the timeline representation based at least in part on receiving the second time range via the panning or zooming input.

2. The method of claim 1, further comprising:
receiving, from the mobile vehicle, a plurality of vehicle position values, wherein each vehicle position value is associated with a location of the mobile vehicle at a respective position time, and wherein the timeline representation further comprises a third visual indication of one or more of the plurality of vehicle position values at respective position times within the time range.

3. The method of claim 2, wherein the vehicle position values comprise altitude values, and wherein the third visual indication of the one or more vehicle position values comprises a graph of the altitude values over the time range based on the respective position times.

4. The method of claim 2, wherein at least one of the plurality of operational events is overlaid on the third visual indication according to its associated event time.

5. The method of claim 2, wherein the third visual indication comprises an indication of at least one positioning threshold or an indication of the plurality of vehicle position values relative to the at least one positioning threshold.

6. The method of claim 1, further comprising:
receiving an indication of a selection of a first operational event of the one or more of the plurality of operational events; and
in response to receiving the indication of the selection, displaying additional information associated with the first operational event.

7. The method of claim 1, wherein:
displaying the timeline representation comprises displaying one or more vehicle identifiers associated with the mobile vehicle.

8. The method of claim 1, further comprising:
determining, based on at least one operational event of the plurality of operational events, at least one trip phase of the mobile vehicle, wherein displaying the timeline representation comprises displaying an indication of the at least one trip phase.

9. The method of claim 1, wherein the timeline representation comprises a first timeline comprising the first visual indication and a second timeline comprising the second visual indication, the second timeline being time-aligned with the first timeline.

10. The method of claim 1, wherein the plurality of operational events comprises a departure event, a scheduled departure time, an arrival event, a scheduled arrival time, an embarkation event, a vehicle status change, or a combination thereof.

11. The method of claim 1, wherein the one or more network communication metrics comprise one or more of: a number of the plurality of devices, a quality of service for the plurality of devices, a type of the plurality of devices, a data rate, a data volume, a modulation and coding scheme for communications via the network access terminal, bandwidth information associated with the communications via the network access terminal, an error rate for the communications via the network access terminal, a latency for the communications via the network access terminal, traffic type information for traffic associated with the plurality of devices, user subscription information associated with the plurality of devices, a status of the network access terminal, or a status of an auxiliary equipment to the network access terminal.

12. The method of claim 1, wherein at least a first network metric value of the plurality of network metric values is received from a network entity of the communication system.

13. The method of claim 12, wherein at least a second network metric value of the plurality of network metric values is received from the network access terminal of the mobile vehicle.

14. The method of claim 1, wherein the mobile vehicle comprises an aircraft, a ship, a train, a bus, or a helicopter.

15. An apparatus for monitoring network communication for a mobile vehicle, comprising:
a processor,
memory in electronic communication with the processor; and
instructions stored in the memory and executable by the processor to cause the apparatus to:
receive, from the mobile vehicle, a plurality of operational events associated with at least a first trip and a second trip of the mobile vehicle, wherein each of the operational events is associated with an event time;
receive a plurality of network metric values for each of one or more network communication metrics associated with a network access service provided by a communication system to a plurality of devices on the mobile vehicle via a network access terminal of the mobile vehicle, wherein each of the network metric values is associated with a value time;
receive, via an input device, an indication of a time range associated with the first trip of the mobile vehicle;
in response to receiving the indication, display, on an electronic display, a timeline representation that comprises:
a first visual indication of one or more of the plurality of operational events that are associated with respective event times within the time range displayed on the timeline representation according to the respective event times; and
a second visual indication of one or more of the plurality of network metric values that are associated with respective value times within the time range displayed on the timeline representation according to the respective value times;
while displaying the timeline representation, receive an indication of a second time range via a panning or zooming input, wherein the second time range is associated with a portion of the first trip and a portion of the second trip; and
in response to receiving the indication of the second time range, update the display of the timeline representation based at least in part on receiving the second time range via the panning or zooming input.

16. The apparatus of claim 15, wherein the instructions are further executable by the processor to cause the apparatus to:
receive, from the mobile vehicle, a plurality of vehicle position values, wherein each vehicle position value is associated with a location of the mobile vehicle at a respective position time, and wherein the timeline representation further comprises a third visual indication of one or more of the plurality of vehicle position values at respective position times within the time range.

17. The apparatus of claim 16, wherein the vehicle position values comprise altitude values, and wherein the third visual indication of the one or more vehicle position values comprises a graph of the altitude values over the time range based on the respective position times.

18. The apparatus of claim 16, wherein at least one of the plurality of operational events is overlaid on the third visual indication according to its associated event time.

19. The apparatus of claim 16, wherein the third visual indication comprises an indication of at least one positioning threshold or an indication of the plurality of vehicle position values relative to the at least one positioning threshold.

20. The apparatus of claim 15, wherein the instructions are further executable by the processor to cause the apparatus to:
receive an indication of a selection of a first operational event of the one or more of the plurality of operational events; and
in response to receiving the indication of the selection, displaying additional information associated with the first operational event.

21. The apparatus of claim 15, wherein the instructions are further executable by the processor to cause the apparatus to:
determine, based on at least one operational event of the plurality of operational events, at least one trip phase of the mobile vehicle, wherein displaying the timeline representation comprises displaying an indication of the at least one trip phase.

22. The apparatus of claim 15, wherein the timeline representation comprises a first timeline comprising the first visual indication and a second timeline comprising the second visual indication, the second timeline being time-aligned with the first timeline.

23. The apparatus of claim 15, wherein the one or more network communication metrics comprise one or more of a number of the plurality of devices, a quality of service for the plurality of devices, a type of the plurality of devices, a data rate, a data volume, a modulation and coding scheme for communications via the network access terminal, bandwidth information associated with the communications via the network access terminal, an error rate for the communications via the network access terminal, a latency for the communications via the network access terminal, traffic type information for traffic associated with the plurality of devices, user subscription information associated with the plurality of devices, a status of the network access terminal, or a status of an auxiliary equipment to the network access terminal.

24. An apparatus for monitoring network communication for a mobile vehicle, comprising:
means for receiving, from the mobile vehicle, a plurality of operational events associated with at least a first trip and a second trip of the mobile vehicle, wherein each of the operational events is associated with an event time;
means for receiving a plurality of network metric values for each of one or more network communication metrics associated with a network access service provided by a communication system to a plurality of devices on the mobile vehicle via a network access terminal of the mobile vehicle, wherein each of the network metric values is associated with a value time;
means for receiving, via an input device, an indication of a time range associated with the first trip of the mobile vehicle;
means for, in response to receiving the indication, displaying, on an electronic display, a timeline representation that comprises a first visual indication of one or more of the plurality of operational events that are associated with respective event times within the time range displayed on the timeline representation according to the respective event times, and further displaying a second visual indication of one or more of the plurality of network metric values that are associated with respective value times within the time range displayed on the timeline representation according to the respective value times;
means for, while displaying the timeline representation, receiving an indication of a second time range via a panning or zooming input, wherein the second time range is associated with a portion of the first trip and a portion of the second trip; and
means for, in response to receiving the indication of the second time range, updating the display of the timeline representation based at least in part on receiving the second time range via the panning or zooming input.

25. A non-transitory computer-readable medium storing code for monitoring network communication for a mobile vehicle, the code comprising instructions executable by a processor to:
receive, from the mobile vehicle, a plurality of operational events associated with at least a first trip and a second trip of the mobile vehicle, wherein each of the operational events is associated with an event time;
receive a plurality of network metric values for each of one or more network communication metrics associated with a network access service provided by a communication system to a plurality of devices on the mobile vehicle via a network access terminal of the mobile vehicle, wherein each of the network metric values is associated with a value time;
receive, via an input device, an indication of a time range associated with the first trip of the mobile vehicle;
in response to receiving the indication, display, on an electronic display, a timeline representation that comprises a first visual indication of one or more of the plurality of operational events that are associated with respective event times within the time range displayed on the timeline representation according to the respective event times and a second visual indication of one or more of the plurality of network metric values that are associated with respective value times within the time range displayed on the timeline representation according to the respective value times
while displaying the timeline representation, receive an indication of a second time range via a panning or zooming input, wherein the second time range is associated with a portion of the first trip and a portion of the second trip; and
in response to receiving the indication of the second time range, update the display of the timeline representation based at least in part on receiving the second time range via the panning or zooming input.

* * * * *